Dec. 21, 1954     E. D. MOSHER     2,697,623
FLUID SEAL CONSTRUCTION
Filed Feb. 6, 1951

EZRA D. MOSHER
INVENTOR.

BY Vandeveer Voorhees
Atty.

United States Patent Office 2,697,623
Patented Dec. 21, 1954

2,697,623

FLUID SEAL CONSTRUCTION

Ezra D. Mosher, Van Wert, Ohio, assignor, by mesne assignments, to National Motor Bearing Co., Inc., Redwood City, Calif., a corporation of California Application February 6, 1951, Serial No. 209,683

1 Claim. (Cl. 288—2)

This invention relates to a fluid seal construction and more particularly to a seal constructed of rubber or similar elastomeric composition for application to moving shafting. The invention relates still more particularly to a molded rubber shaft seal having a metal reinforcing ring embedded therein and adapted to support the periphery of the seal which is in contact with the housing bore in which the seal is installed. Still more particularly, the invention relates to the construction of a shaft seal of a molded oil-resistant elastomer such as butadiene-acrylonitrile rubber (Buna N), neoprene rubber and the like, for sealing greases and mineral lubricating oils in bearings from which shafting protrudes.

In the sealing of moving shafting with molded rubber seals it has heretofore been a problem to maintain fluid-tight contact between the seal and the housing bore into which the seal is pressed. The properties of rubber are such that it cannot be relied upon alone to maintain a satisfactory fluid-tight contact with the housing, and numerous attempts have been made to overcome this problem by reinforcing the rubber. One method commonly employed is to incase the rubber seal in a metal case which in turn can be pressed into the housing in a fluid-tight relation therewith. Another method of solving the problem has been to mold within the rubber a metal part which may act to support the rubber. Such a seal is shown in the patent of Johnson #2,249,141, in which a metal flange is embedded in the rubber, so as to provide a cylindrical metal surface underlying the periphery of the seal. Difficulty has been encountered in the installation of this seal owing to the tendency of the rubber to be stripped from the metal at the face of the seal when it is installed in a close-fitting housing bore, particularly when cocked at an angle to the bore.

An object of my invention is to provide a molded rubber seal having a metal reinforcement supporting the periphery thereof from which the rubber will not easily be stripped during installation even when the seal is installed in a cocked position. Another object of my invention is to provide a metal reinforced molded rubber seal having a reinforcing ring which can be produced at low cost using a minimum amount of metal. Still another object of my invention is to produce a metal reinforced rubber seal which can be manufactured rapidly. A still further object of my invention is to provide a metal reinforced molded rubber seal having a high flexibility in the sealing lip, thereby adapting it to sealing shafting which is not running true. Other objects of the invention will become apparent from the following description thereof.

Figure 1:
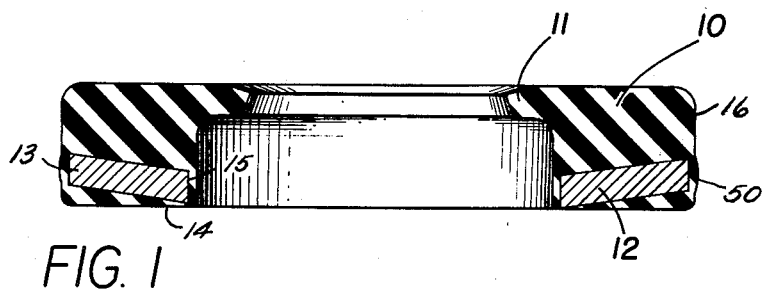
Fig. 1 is a view in elevation and in section of a fluid seal embodying the principles of the invention.

Referring to Figure 1 of the drawing, the rubber element 10 is molded integrally with the sealing lip section 11, the rubber completely surrounding the metal reinforcing ring 12. Ring 12 is suitably a steel washer which is dished so that the outer periphery 13 thereof is offset from the face 14 in the direction of the body of the seal, thereby making it possible to locate the ring 12 in the mold on the inner edge or pierce 15, while the outer edge is completely surrounded by rubber. The reinforcing ring 12 shown in Figure 1 has been dished before being cut from the plate from which it was formed, with the result that both the outer edge 13 and the inner edge 15 lie substantially parallel with the axis of the seal. This not only permits the edges of the ring to be easily covered with rubber, but more particularly, it provides a uniform support of the outer periphery 16 of the seal, which must be pressed into the housing bore. If desired, the metal ring 12 may be made with only the outer edge 13 formed parallel to the axis.

Figure 2:
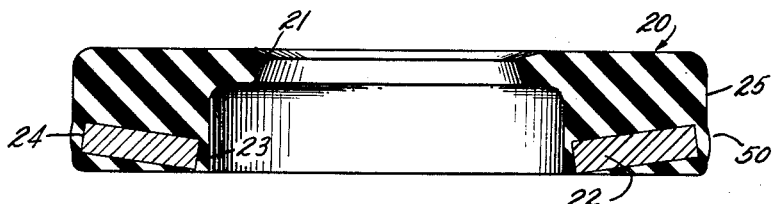
Fig. 2 is a view similar to Fig. 1 of a modified form of seal also embodying the invention.

Figure 2 shows a similar seal 20 with a sealing lip 21 in which the reinforcing ring 22 is made from a plain washer which is dished after cutting from the metal plate. The cutting and dishing operation may be performed in a single pressing operation by proper designing of the punch. In this seal 20, neither the inner periphery 23 nor the outer periphery 24 of the washer 22 is parallel to the axis of the seal or to the seal's outer periphery 25.

Figure 3:
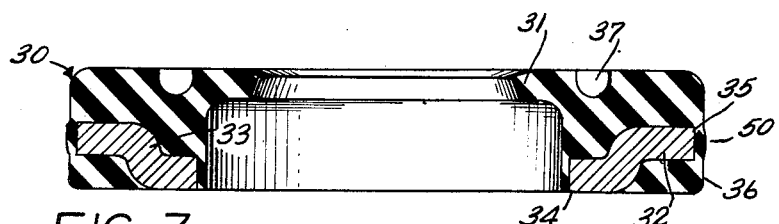
Fig. 3 is a view similar to Figs. 1 and 2 of another modified form of the invention.

Figure 3 shows a modified form of seal 30 with a lip 31 and a reinforcing ring 32 in which the ring is offset at 33 with its inner edge 34 and outer edge 35 substantially parallel to the axis. This accomplishes the same purpose of maintaining the inner edge 34 of the washer adjacent to the face of the seal while the outer edge 35 is completely embedded in rubber and positioned near the center of the external cylindrical sealing surface 36.

In order to increase the flexibility of the lip 31, the rubber behind the lip may be relieved by providing a groove 37 in the inner face 38 of the seal 30 extending into the body of the rubber. The same method of increasing the lip flexibility may be applied to the seals shown in Figures 1 and 2 if desired.

Figure 4:
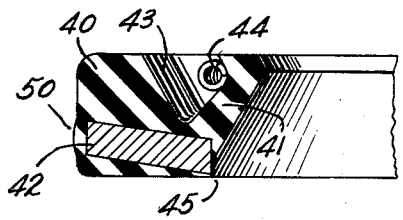
Fig. 4 is a view similar to Figs. 1–3 of still another modified form of the invention.

Referring to Figure 4, another modified form of seal 40 is shown with a lip 41 and with the reinforcing ring or washer 42 embedded in the rubber seal body, and the rubber is extended toward the axis through lip section 41. A spring groove 43 is provided in the lip 41 to retain a garter spring 44 or other elastic tensioning device for maintaining the desired contact pressure between the sealing lip 41 and the moving shaft which it engages. It will be noted that the reinforcing ring 42 is completely embedded in the rubber except at the edge 45, which serves the purpose of locating the reinforcing ring 42 accurately in the mold.

For some applications it is desirable to protect the reinforcing ring from corrosive agents such as acids, in which case I may cut away sections of the ring at the inner edge, leaving only spaced points for the purpose of locating it in the mold. In any case, it is important to provide for accurate location of the reinforcing ring in the mold in order that the rubber overlying the outer edge of the reinforcing be of substantially uniform thickness at the periphery of the seal. A substantial variation in thickness of the rubber on the periphery of the seal overlying the reinforcing ring results in non-concentric positioning of the seal in the housing with concomitant defective sealing action on the moving shaft and uneven wear.

It has been found that the seals made according to my invention have a slightly raised area on the periphery directly overlying the reinforcing ring as illustrated at 50 in the drawings. This slightly raised area 50 results from the natural shrinkage of the rubber in the unsupported areas during the molding operation and subsequently. This raised area or "crown" is an advantage in installation of my improved seal, making it easy to install and at the same time providing a permanent leak-tight juncture between the seal and the housing. In fact, the seal can be installed from either side with almost equal facility. It is generally desirable to provide about .012 to .020 inch of rubber overlying the metal reinforcing ring and the diameter of the seal should be about .008 to .012 inch greater than the diameter of the housing bore into which it is pressed.

As indicated hereinabove neoprene or Buna N are suitable materials from which my flexible composition may be compounded. I may also employ silicone rubber, polyacrylic rubber, Thiokol, and similar oil-resistant elastic compositions. A suitable composition made from Buna N contains the usual additions of carbon black, sulfur, accelerator, antioxidant and metal oxides such as zinc oxide and magnesium oxide. The curing time on a typical composition of this type is about 10 minutes at about 300° F. It is desirable that the composition have a hardness of about 60 to 90 ASTM (D676–49T) preferably about 70 to 80.

My seals may be made by injection or transfer molding or by compression molding and the sealing lip member in contact with the shaft may be molded directly or it may be formed more accurately by trimming in a manner customary in the art. In order to obtain a strong bond between the metal of the reinforcing ring and the rubber, it is desirable to thoroughly clean the metal and coat it with a bonding cement such as "Pliobond," "Ty-Ply" or similar bonding agents. These bonding cements are usually formed of snythetic resins or chlorinated resins or rubber.

Having thus described my invention, what I claim is:

In a fluid seal adapted to seal the space between a rotating shaft and a fixed housing, the combination of an integral molded elastic body and a reinforcing member incorporated therein, said body having adjacent one of its radial faces a radially inwardly-extending flexible lip section adapted to engage said shaft with a sliding leak-tight fit, said body having on the opposite axial surface a radially outwardly-extending heel portion with a periphery adapted to engage said housing with a leak-tight non-rotative fit; said reinforcing member comprising a conical ring molded in said body having a uniformly circular inner edge exposed and lying adjacent the opposite radial face from said lip section and having its outer periphery covered with said heel portion.

References Cited in the file of this patent

UNITED STATES PATENTS

| Number | Name | Date |
|---|---|---|
| 2,162,104 | Mosher | June 13, 1939 |
| 2,172,325 | Victor et al. | Sept. 5, 1939 |
| 2,249,141 | Johnson | July 15, 1941 |
| 2,405,279 | Victor | Aug. 6, 1946 |
| 2,468,247 | Victor | Apr. 26, 1949 |
| 2,587,405 | Stevens et al. | Feb. 26, 1952 |

FOREIGN PATENTS

| Number | Country | Date |
|---|---|---|
| 544,732 | Great Britain | of 1942 |
| 700,403 | Germany | of 1940 |